United States Patent

[11] 3,631,535

| [72] | Inventors | Thomas Bilinski, Jr.<br>North Wales;<br>Donald W. Fleischer, Ambler; Jared M.<br>McGowan, Norristown, all of Pa. |
|---|---|---|
| [21] | Appl. No. | 748,014 |
| [22] | Filed | July 26, 1968 |
| [45] | Patented | Dec. 28, 1971 |
| [73] | Assignee | Credit Systems, Inc.<br>Gwynedd, Pa. |

[54] CREDIT CARD DECODER
18 Claims, 18 Drawing Figs.

[52] U.S. Cl. .................................... 340/149, 340/147
[51] Int. Cl. ....................................... H04g 1/00, H04g 3/00, H04g 9/00
[50] Field of Search ............................ 340/149 A

[56] References Cited
UNITED STATES PATENTS

| 3,184,714 | 5/1965 | Brown .......................... | 340/149 A |
| 3,315,230 | 4/1967 | Weingart ...................... | 340/149 A |
| 3,394,246 | 7/1968 | Goldman ...................... | 340/149 A |

*Primary Examiner*—Harold I. Pitts
*Attorney*—Sperry and Zoda

ABSTRACT: A tray supporting a coded credit card and a document (such as a sales slip) is advanced and latched, shifting a code-sensing contact block into a code-reading position in which it signals a computer. Affirmative or negative intelligence is stored in the computer with respect to each code. If the computer signal is affirmative, a roller imprints information (for example, the cardholder's name and address) from the card to the document, and the tray is released so that the imprinted document may be removed. If the signal is negative, the tray is released without imprint of the document.

Fig. 1.

INVENTORS
THOMAS BILINSKI, JR. &
DONALD W. FLEISCHER
BY JARED M. MC GOWAN,
N.perry and Soda
ATTORNEYS

INVENTORS
THOMAS BILINSKI, JR &
DONALD W. FLEISCHER
JARED M. MC GOWAN

BY Sperry and Zoda
ATTORNEYS

CREDIT CARD DECODER

CROSS REFERENCE TO RELATED APPLICATION

The present application is related to copending application Ser. No. 650,049 filed June 29, 1967, by Thomas Bilinski now U.S. Pat. 3,419,213 issued Dec. 31, 1968.

BACKGROUND OF THE INVENTION

1. Field of the Invention

The invention relates to electrical communications, in particular those incorporating a selective function wherein transmission of a selected impulse to a remote location produces at said location an electrical comparison of said impulse with stored intelligence to effect a return signal which, according to the stored intelligence, will be either affirmative or negative.

Although apparatus having the characteristics described above is usable in any of various fields, one in which it can be employed advantageously is consumer credit information. Thus, in a department store, a salesperson is enabled to insert a customer's coded credit card in the apparatus constituting the present invention, together with a sales slip, and receive almost instantaneously intelligence as to whether the customer is or is not permitted to charge the purchase.

2. Description of the Prior Art

Heretofore, credit check systems utilizing the concept of comparison of transmitted, coded data or intelligence, have been devised, as may be noted from patents such as Brothman et al. U.S. Pat. No. 3,308,238 issued Mar. 7, 1967, or Weingart U.S. Pat. No. 3,315,230, issued Apr. 18, 1967.

The desirability of a system wherein an individual such as a sales clerk can speedily and accurately receive credit information with respect to a customer who has just made a purchase, has been well stated in patents such as those indicated. The time-honored procedure, prior to the advent of high-speed, automatically operated electrical communication systems involving memory storage apparatus, has been for the salesperson to telephone the credit office of the establishment, providing name, address, and possibly account number of the customer, after which the salesperson must wait until the credit clerk checks the customer's account and verbally advises whether or not the customer may be extended the credit. Such an arrangement is of course very slow, and a high percentage of error exists therein. Whether the error results in the customer being granted credit when credit should be denied, or is denied credit when said credit should have been granted, the consequences are equally disastrous and embarrassing.

In this connection, although systems such as shown in the patents referred to above obviate the the above-noted difficulties, there still remains considerable room for improvement, and in particular, it is very desirable to provide a highly simplified, compact, relatively low cost piece of equipment at each sales station, that will make use of conventional, coded, plastic-encased credit cards and conventional code systems, in a manner whereby the affirmation or negation of credit will be instantaneously indicated upon the accompanying sales slip simply by imprinting on the sales slip the embossed information carried by the typical credit card (name, address, and account number), or by leaving the sales slip without such imprint if credit is to be denied. The present invention aims to provide apparatus so simplified as a general improvement upon equipment heretofore devised for similar purposes.

SUMMARY OF THE INVENTION

To provide the simplified, compact unit which to my knowledge has heretofore not been produced when the teachings of the prior art are followed, the apparatus constituting the present invention incorporates a tray sliding upon a support frame or chassis within a suitable housing. The tray receives a coded credit card, on which the holder's name, address, and usually his account number, are embossed. A document on which the indication of good credit is to be imprinted (or which is to be left imprinted to show bad credit) is positioned over the credit card, and the tray is shifted inwardly by the user. This operation effects movement of a code-sensing block, which is carried by the tray assembly, into an engagement with the card. According to the code which the block reads upon contact with the card, a signal is automatically transmitted to a remotely located computer or central memory. There is returned, instantaneously to all intents and purposes, to the apparatus constituting the invention, an answering signal, which may be that the credit is good. Alternatively, the answering signal may be that the customer has poor credit.

The apparatus comprising the invention includes a motor-driven roller assembly, mounted above the tray assembly. If the "good credit" signal is received, the motor is energized, and drives the roller through a single printing cycle. The roller is, in this instance, moved over the sales slip, and causes, by pressure upon the embossed characters of the credit card, imprinting of the customer's name, address, and account number upon the sales slip. At the same time, the roller assembly unlatches the advanced tray, and ejects the tray with the card and sales slip. If, alternatively, a "bad credit" signal is received, a solenoid is actuated instead of the motor, which unlatches the tray assembly without imprinting of the sales slip. The ejection of the sales slip without imprint informs the salesperson that the customer's credit is not good, and that the charge sale is not approved.

DESCRIPTION OF THE PREFERRED EMBODIMENT

Figure 1:
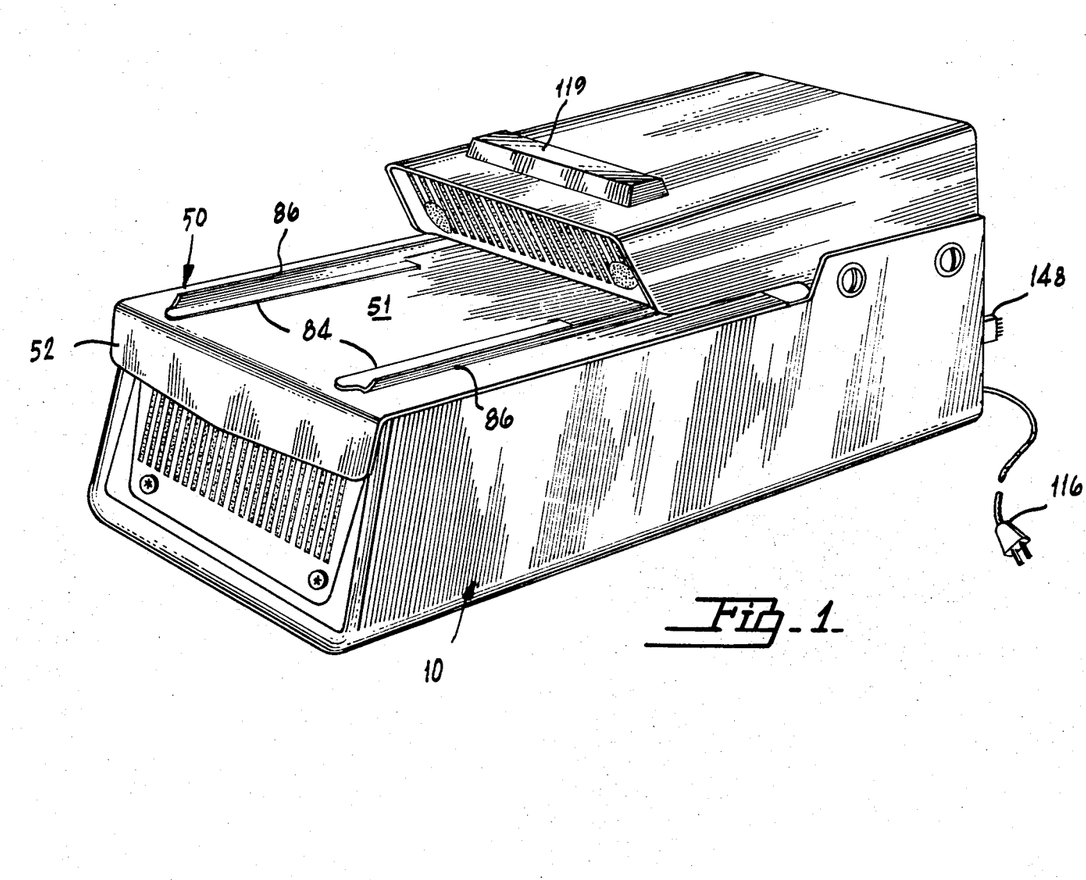
FIG. 1 is a perspective view of apparatus according to the present invention.

In FIG. 1, the device constituting the present invention has been shown as it appears ready for use. It includes a housing 10, which is of generally rectangular configuration, and which in a commercial embodiment is on the order of about 12 inches in length and 6 inches, approximately, in width so as to occupy a comparatively small amount of space at an employee's work station.

Referring to FIGS. 4–7, wherein the top, sides, front, and back of the housing, have been removed, mounted upon the flat bottom plate 12 of the housing is a rigid support frame or chassis generally designated 13 including (see FIGS. 3 and 4) vertical sideplates 14 extending the length of the frame at opposite sides thereof, and formed with inturned feet 16 affixed to the side portions of the base 12, at locations spaced longitudinally of the base.

At the rear end of the frame, sideplates 14 are formed with inwardly directed support flanges 18 to which is fixedly secured a gear-reduction motor 20 arranged when energized to rotate an upstanding shaft 22 through a single 360° cycle. Pinned to the shaft 22 is an eccentric 24 which, when rotated through a single cycle with shaft 22, operates a printing assembly generally designated 25 through a single linear stroke, from its normal rest position shown in FIG. 4 to its FIG. 6 tray-unlatching position, and back to its rest position.

Printing assembly 25 includes a flat, horizontal drum carrier plate 26, having (see FIG. 2) a transversely elongated oval opening 28 receiving eccentric 24. At its front end, plate 26 has forwardly projecting yoke arms 30 in which are journaled the ends of shaft 32 carrying a printing drum or roller 34. This is an inking roller, and the roller material, and ink used, may be such as disclosed in U.S. Pat. No. 2,620,730 issued Dec. 9, 1952, to Charles H. Gilbert.

The extremities of shaft 32 are supported by guide blocks 36 having confronting longitudinal guide slots 38 receiving the shaft ends.

Figure 4:
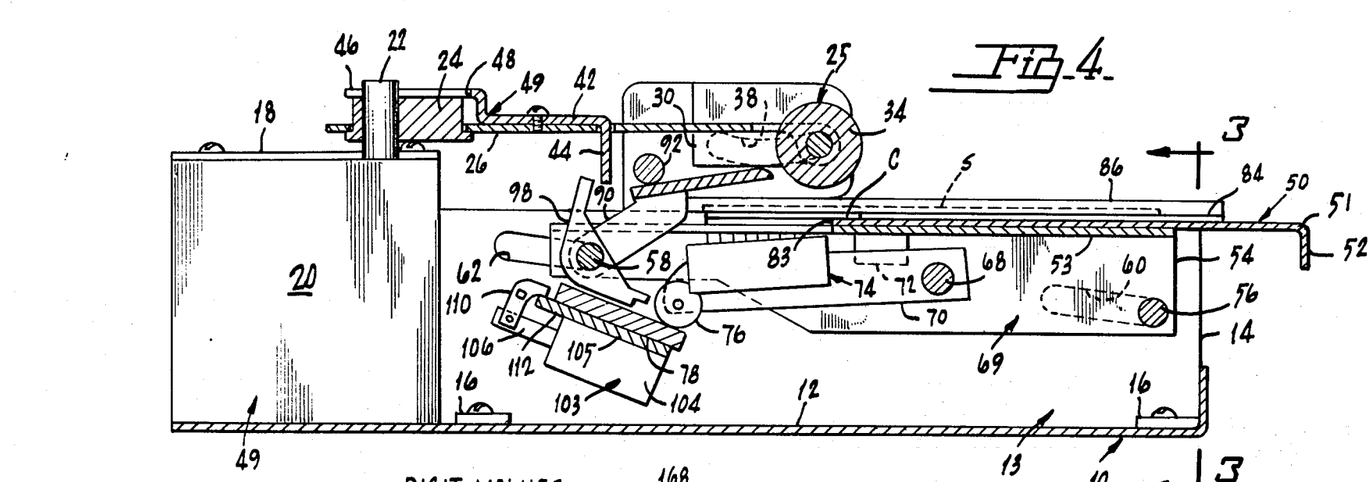
FIG. 4 is a longitudinal sectional view substantially on line 4—4 of FIG. 3 with the parts being shown in their initial or rest position.
Figure 6:
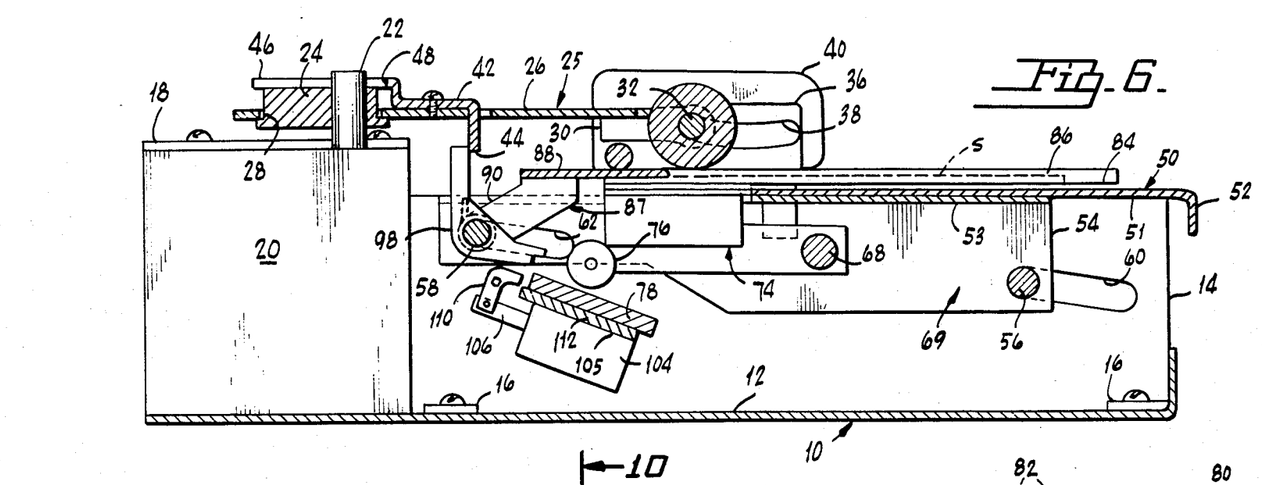
FIG. 6 is a view similar to FIG. 4 in which, responsive to receipt of a "good credit" signal, the roller assembly has been operated to imprint the sales slip and the tray assembly has been unlatched to permit its return to its normally retracted position.

As will be noted from FIG. 4, guide slots 38 have horizontal intermediate portions, merging into upwardly turned end portions. As a result, when the roller is in its rest position shown in FIG. 4, it is elevated slightly above the plane of the horizontal intermediate portions of the slots, but when motor 20 goes into operation, the roller almost immediately moves into a lower plane as shaft 32 travels through the lower intermediate portions of the guide slots. While the roller is in said lower plane, it is in printing position, having now been brought into a pressure-exerting position as regards the sales slip S disposed immediately therebelow in superposed relation to embossed card C. Thereafter, at the completion of the printing operation, the roller moves into the opposite, upwardly turned ends of guide slots 38 as shown in FIG. 6. In this position, the roller is again elevated out of contact with the sales slip S.

Guide blocks 36 are preferably of a material having a low coefficient of friction, such as nylon, and are secured to the inner surfaces of vertical extensions 40 of sideplates 14 of chassis 13. The guide blocks, in this connection, are appropriately considered as parts of the support frame or chassis, in the sense of being the stationary support structure for the movably mounted components of the apparatus.

Printing assembly 25 further includes a trip plate 42 overlying and fixedly secured to the carrier plate 26. As shown in FIG. 4, trip plate 42 at its front end has a depending trip finger 44 extending downwardly through a transverse slot formed in the plate 26. At its rear end, trip plate 42 has an upwardly offset extension 46 formed with a longitudinal guide slot 48 receiving shaft 22 to maintain the printing assembly in its proper path during the reciprocating motion thereof caused by rotation of eccentric 24.

It may be here observed that the printing assembly 25 operates whenever the existence of a first fact, condition, or intelligence is to be communicated to the user. Said indication of the first fact (which in the illustrated example is the existence of "good credit") is reflected by imprinting of sales slip S in response to operation of roller 34 through its single reciprocation.

Accordingly, motor 20, the motion-translating driving connection constituted by shaft 22 and eccentric 24, and printing assembly 25, may properly be terms as a means 49 for indicating a first fact, in the present instance "good credit", in respect to a coded credit card C inserted in the machine.

Figure 2:
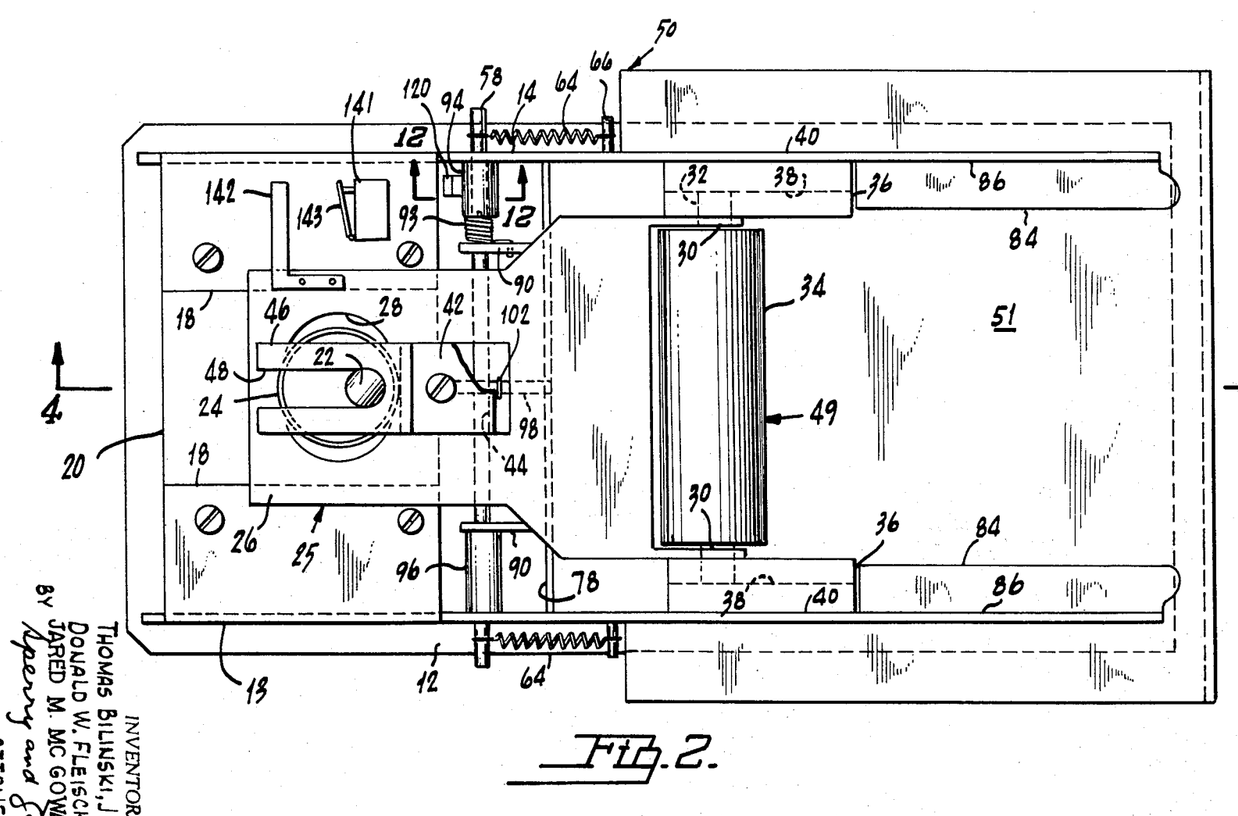
FIG. 2 is a top plan view of the apparatus, on a scale enlarged above that of FIG. 1, with the housing removed.

Another important assembly of the apparatus is a card support means generally designated 50. This includes a card-support tray 51 which, as shown in FIGS. 1, 2, and 4, is a wide, flat plate exposed at the top, forward portion of the housing, and having, at its front end, a depending lip 52 providing a handle for the salesperson or other user.

Figure 3:
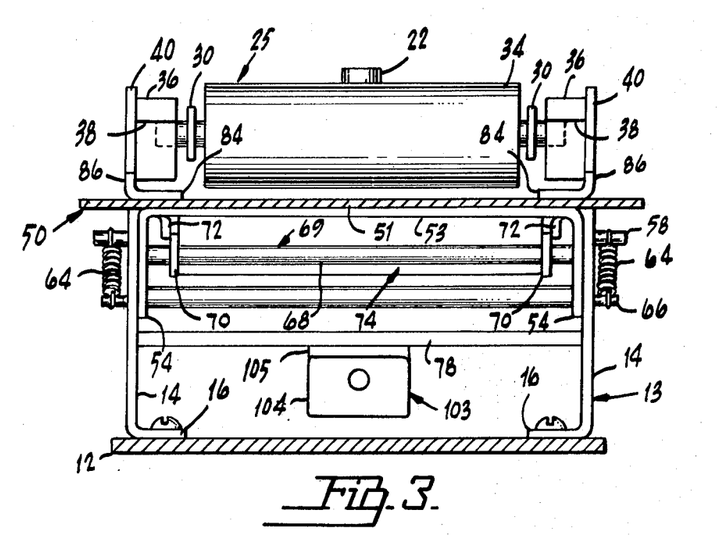
FIG. 3 is a transverse sectional view taken adjacent the front end of the apparatus with the housing removed, substantially on line 3—3 of FIG. 4.

Affixed to the underside of tray 51 is a tray support plate 53 of inverted U-shape in cross section, having depending side flanges 54 which as shown in FIG. 3 are substantially in face-to-face contact with sideplates 14 of the support frame. Secured to and extending between sideplates 54 are front and rear cross bars 56, 58 respectively, the extremities of which are slidably engaged in rearwardly upwardly inclined guide slots 60, 62 respectively formed in sideplates 14.

Figure 5:
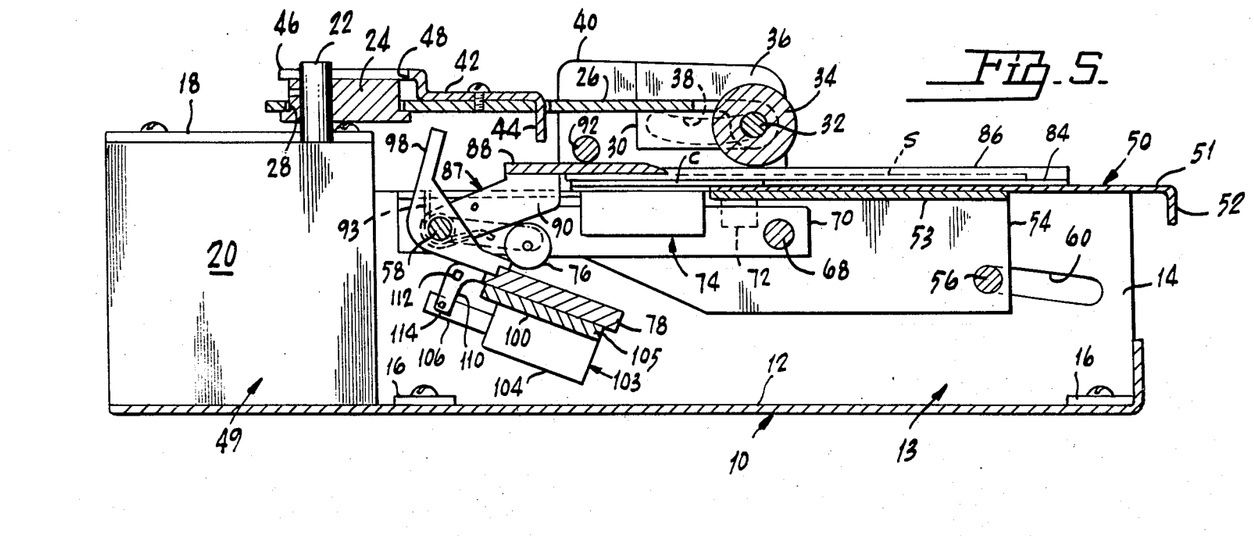
FIG. 5 is a view similar to FIG. 4 in which the tray assembly has been advanced and latched.

The tray is normally in a rest position shown in FIG. 4, also termed a retracted position, When in this position, it is adapted to receive a card C and sales slip S or other accompanying document, after which the user pushes the tray forwardly to its advanced position shown in FIG. 5. In this connection, the tray is normally biased yieldably and resiliently to its retracted position by extension springs 64 connected between screws 66 of the support frame, which serve as retaining pins for the springs, and projecting end portions of a cross bar 58 connected between the side flanges 54.

The parts designated 51 through 68 together constitute a tray assembly generally designated 69 that may appropriately be considered as a component portion of the card support means 50.

Card support means 50, in this regard, also includes a code-sensing means carried by the tray assembly. Referring to FIG. 4, and also to FIG. 3, a pair of yoke arms 70 are pivoted, at one end, upon cross number 68, and are retained against lateral displacement by tabs 72 struck downwardly out of the material of the support plate 53.

Carried by and extending transversely between yoke arms 70 is a pin or contact block 74. This is normally supported by yoke arms 70 in a lowered, retracted position shown in FIG. 4. In use of the apparatus, however, it is biased upwardly to a code-sensing position shown in FIG. 5, in response to advancement of the tray assembly from its retracted to its advanced position.

The shifting of the sensing block 74 upwardly to its FIG. 5 position is accomplished through the medium of a downwardly projecting nose 76 on the distal end of each yoke arm 70. Nose 76, in the illustrated, preferred embodiment, is formed as a roller freely turning upon its associated arm 70, and rollably supported upon an upwardly, rearwardly inclined cam plate 78. Plate 78 is affixed to and extends between sideplates 14, and constitutes a portion of the support frame. Yoke arms 70 normally tend, with their supported block 74, to gravitate to a position effective to maintain the rollable contact of nose 76 with cam plate 78. Accordingly, when the tray assembly is advanced as previously described herein, the inclination of the cam plate 78 causes yoke arms 70 to be pivoted upwardly from their FIG. 4 to their FIG. 5 positions, thus bringing the block 74 into contact with the credit card C supported upon tray 51.

Block 74, in the illustrated embodiment, utilized the well-known Hollerith Code. To this end, the block includes a contact spring support member 150, of rectangular configuration, formed of electrical insulation material and including, in its top surface, a series of side-by-side, upwardly opening, deep, transversely extending recesses 152 closed along one side of the block, and communicating, at the opposite side, with upwardly opening notches 154 formed in the sidewall of the member 150.

Figure 14:
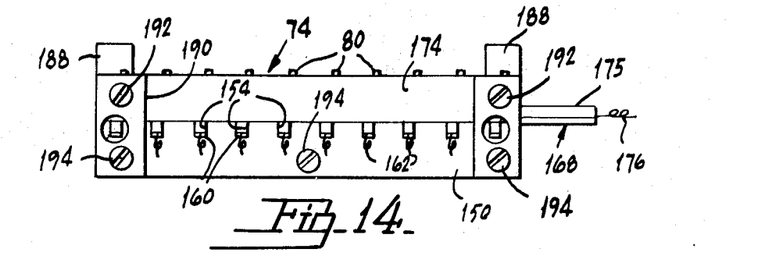
FIG. 14 is a side-elevational view of the block as seen from line 14—14 of FIG. 13.

In each recess 152 is a contact spring generally designated 156 of electrically conductive spring material, integrally formed with an elongated, flat base 158 seated in the bottom of and extending the length of its associated transverse recess 152 of member 150. At one end, base 58 is formed with a longitudinal extension 160 projecting laterally outwardly from member 150 through its associated notch 154 (see FIG. 14). Soldered to each extension 160 is a lead 162.

Figure 16:
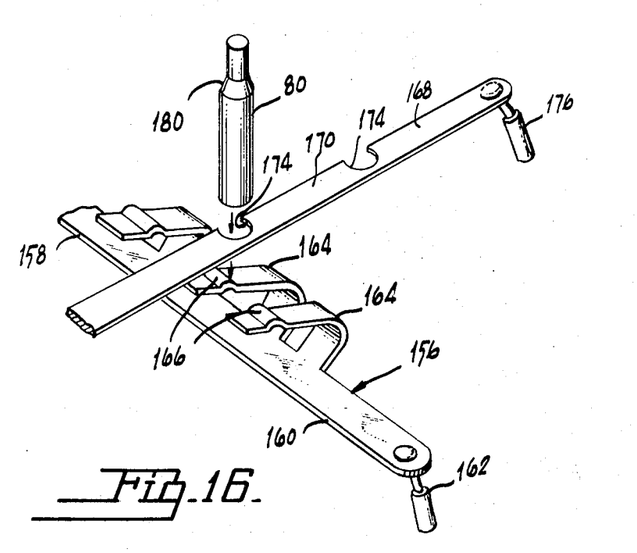
FIG. 16 is an enlarged fragmentary perspective view of a contact spring, contact strip, and depressor pin of the code-sensing block.

At closely spaced intervals along the length of each contact spring base 158, contact spring elements 164 are formed integrally with base 158, extending upwardly transversely of base 158 as best seen in FIG. 16. Adjacent the distal ends of elements 164, transverse ribs 166, providing contact surfaces, are formed on the respective elements.

Figure 13:
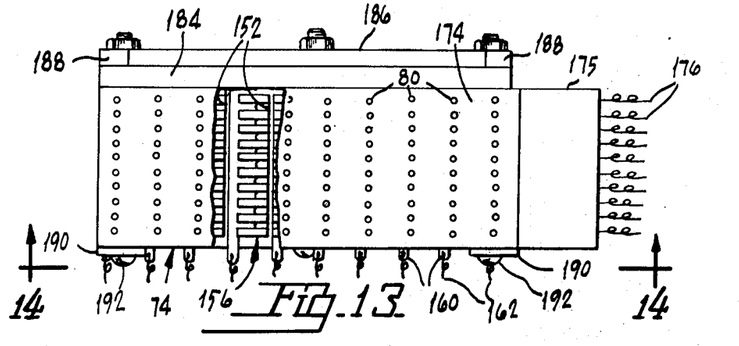
FIG. 13 is a top plan view of the code-sensing block per se on an enlarged scale, a portion being broken away.

In the illustrated embodiment, as seen from FIG. 13, there are 10 spring elements 164 on each of 10 contact springs 156. There are, accordingly, a total of 100 contact spring elements 164. This provides, in the Hollerith Code, a total of 10 digit values, 0 through 9, from which can be selected a digit value for each of the 10 digit positions of a 10-digit number.

Obviously, there could be any number of digit positions. If coded numbers with more than 10 digits are to be processed through the sensor block 74, the block would be constructed with the appropriate number of recesses 152, accommodating contact springs 156. And, the number of digit values per contact spring can also be changed as necessary. It may be noted at this point, that said values need not necessarily be expressed in terms of numerical values, but could be letter values or even combination letter-and-number values.

In any event, in the illustrated embodiment, a series of 10 contact strips 168, one for each digit position, overlies the series of contact springs 156. Like the contact springs 156, the contact strips 168 are all identical to one another. Each comprises an elongated, flat, narrow, electrically conductive strip element 170 extending longitudinally of the sensor block 74 in perpendicular, overlying relation to the several contact springs (see FIG. 16).

In each contact strip 168 there is formed, at uniformly spaced intervals along the length of the strip, clearance recesses 174 through which extend the lower ends of the depressor pins 80. Recesses 174 of each contact strip 168 are disposed above corresponding contact springs 156.

The several contact strips 168 are adhesively or otherwise secured to the underside of contact strip support member 174 of electrically insulative material, disposed in overlying relation to the contact spring support member 150. Member 174 at one end has a thin, flat extension 175 projecting beyond the associated end of member 150, and the contact strips extend outwardly below the extension 175 (see FIG. 14), and are connected to leads 176.

Formed in the member 174 are intersecting transverse and longitudinal rows of openings 178, in each of which a depressor pin 80 is mounted for up and down movement. Openings 178 are counterbored, so as to provide stop surfaces for shoulders 180 formed upon the pins 80.

Figure 15:
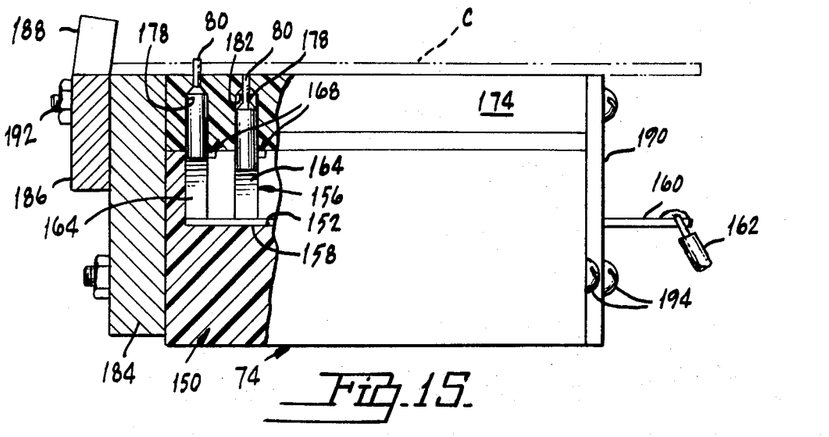
FIG. 15 is a still further enlarged end-elevational view of the block, a portion being shown in transverse section, a coded card being shown in dash dotted outline.

Normally, each spring element 164 tends to elevate its associated pin 80, as will be seen by noting the left hand pin 80 in FIG. 15, out of contact with the stop surface 182 of the opening. In these circumstances, pin 80 projects above the top surface of member 174. Engagement of shoulder 180 against surface 182 limits projection of the pin above member 174.

When, however, a pin 80 is depressed (note the right-hand pin in FIG. 15), so that its upper end is flush with the top surface of the member 174, its stop shoulder moves out of engagement with surface 182. At the same time, the pin will now depress its associated spring element 164 against the inherent spring tension thereof, out of contact with the contact strip 168 that overlies said spring element.

The members 150, 174 are fixedly joined. To this end, I provide an elongated connector bar 184 extending along one side of the members 150, 174. In longitudinally contacting relation to bar 184 is a bar stop bar 186, formed at its ends with upwardly projecting, slightly inclined card stop 188.

At the opposite side of the superposed member 150, 174 there are connecting straps 190, disposed at the ends of said members. Registered openings are formed in the straps, member 174, bar 184, and bar 186, receiving upper connecting bolts 192. Registered openings of the straps, member 150, and bar 184 receive lower connecting bolts 194.

Figure 11:
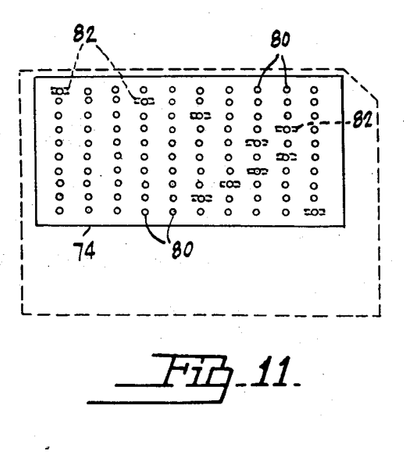
FIG. 11 is a plan view of the contact block adapted to sense the code of the card, the card being shown in dotted lines.
Figure 17:
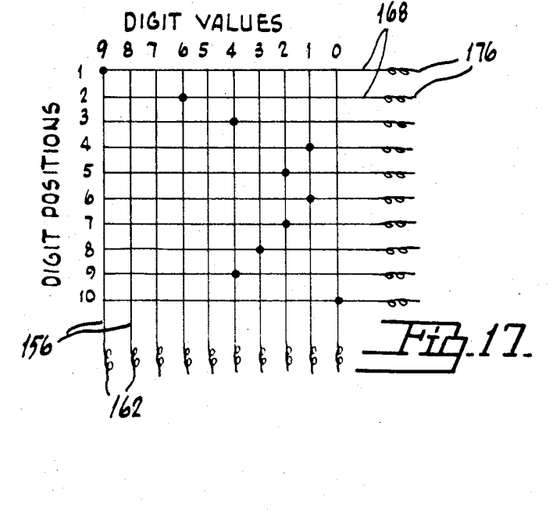
FIG. 17 is a schematic view of the circuit embodied in the code-sensing block.

The longitudinal rows of pins 80 represent digit positions in the account number coded into the credit card C. Or, stated otherwise, each contact strip 168 represents a digit position in said account number. Thus, and referring to FIGS. 11 and 17, if one assumes the credit card number to by 9641212340, the longitudinal row of pins 80 extending horizontally as the uppermost row in FIG. 11, represents the first digit position. Or, as seen in FIG. 17, the longitudinally extending uppermost contact strip 168 schematically illustrated in FIG. 17 represents said first digit position.

This digit position, in the number given by way of example, is occupies by the digit "9". The second row from the top, and the second contact strip 168 from the top, represents the second digit position. In the illustrated example this is occupied by the digit "6".

Within each of the longitudinal rows, digit values are represented by the several pins 80 making up the longitudinal row. Thus, in FIG. 11, the pins 80 at the right-hand ends of the longitudinal rows represent numerical values "0". These values ascend up to "9" represented by the transversely aligned pins 80 disposed at the left-hand extremities of the several longitudinal rows shown in FIG. 11.

Since each pin 80 is in contact at its lower end with an associated contact spring element 164 of a contact spring 156, it is also true that digit values are represented by the several contact springs 156. Referring to FIG. 17, the contact spring 156 extending transversely of the sensor block at the left-hand end of the series of the springs 156 represents the digit value "9". Each contact spring element 164 thereof represents said digit value. The next adjacent spring 156 represents the value "8", and so on through the entire series, going from left to right in the illustrated example. It may be observed at this point that there is nothing critical in having the digit positions ascend in value from top to bottom as shown in FIG. 17, or the digit values ascending in value from right to left, also as shown in this figure of the drawing. The order could be reversed for both digit values and digit positions, or for either of them.

Card C, conventionally, is punched with a series of small, rectangular apertures 82 to code the credit card number into the card (which will usually be a plastic-encased card). As will be observed from FIG. 11, in the illustrated example, when the card is registered with the block 74, the apertures 82 thereof will be so disposed as to provide one aperture in each longitudinal row, located in said row to represent a particular numerical value. It is thus seen that in FIG. 11 the uppermost aperture 82 of card C is at the left-hand extremity of the uppermost row of pins 80, so that the first digit position is occupied by the numerical value "9". This is also shown in FIG. 17 wherein the exemplary code number is schematically represented by block dots at the appropriate intersections of contact strips 168 and contact springs 156.

The next lower aperture of Card C is in registration with pin 80 of the second longitudinal row that represents numerical value "6" so that the second digit of the credit card number is "6". This is carried forth through the complete credit card number.

As hereinbefore noted, under normal conditions, with no card C disposed above the sensor block 74, all the pins 80 are elevated by their associated contact spring elements 164. Therefore, all the contact spring elements 164 are under these conditions in contact with their associated contact strips 168. In effect, each contact spring element 164 and its associated contact strip 168 defines, under these circumstances, a set of normally closed switch contacts. Each set represents a particular numerical value of a particular digit position of the credit card number.

It is apparent that when any pin 80 is depressed, it will open its associated switch contact, that is, it will depress its associated spring element 164 out of engagement with the strip 168 disposed immediately thereabove. It follows that as to any pin 80 which is not depressed from its normal position in which it projects upwardly above the plane of the top surface of member 174, its associated switch contacts remain closed to permit a circuit to be closed therethrough.

Therefore, in the illustrated example, when the pin block 74 is biased upwardly into face-to-face contact with the card C, all pins 80 that are not in registration with an aperture 82 will be depressed by the card, causing their contacts to open. Pins 80 that are in registration with code apertures of the card, however, will remain in their projecting positions, so that their associated contacts will be closed.

It is thus seen that in the illustrated example, pins 80 representing the code number 9641212340 will remain elevated, so that the spring elements 164 associated with these particular pins remain in contact with their associated contact strips 168.

One spring element 164 is thus left in contact with each strip 168, while the remaining nine spring elements that were in contact with said strip 168 will be depressed. In the illustrated example, accordingly, the lead 162 connected to the contact spring 156 representing numerical value "9" is electrically connected to the lead 176 of the contact strip 168 representing the first digit position. Lead 162 of the contact spring representing digit value "6" is similarly electrically connected to lead 176 representing the second digit position, etc.

In a manner well known in the art, and not constituting part of the present invention, a coded signal representing the complete code number is transmitted through the closed contacts to a remotely located computer or central memory, not shown. In the present instance, the electrical signal to the computer advised the computer that the account number on which information is desired is 9641212340.

As will be observed from FIG. 4, the tray assembly 69 has an opening 83 through which the block 74 moves when it is cammed upwardly in the manner previously described.

It is important, of course, that the card be supported upon tray 51 in the exact position required to register its code apertures 82 with the corresponding pins 80 of block 74. Accordingly the card is proportioned to fit snugly between the inner edges 84 of longitudinal guide flanges 86 (See FIGS 1 and 3). The card can be slid forwardly in contact with said edges 84, to a position over opening 83, and is so moved until it is engaged by stops 188. At this time, the card is positioned accurately with respect to block 74. Sales slip S, meanwhile, being somewhat greater in width than the card, is similarly accurately disposed with respect to the card itself. To this end, guide flanges 86 have upstanding outer edge portions, to confine the sales slip against lateral displacement from its proper position.

It is also important that the card and sales slip be clamped securely in position, for sensing of the code and imprinting of the sale slip. To this end, there is provided a card-clamping means generally designated 87. This is carried by the tray assembly and together with the code-sensing means and the tray assembly, comprises part of the card support means 50.

The card-clamping means 87 is normally in a raised, released position shown in FIG. 4. It includes a flat-clamping plate 88 which when retracted is in an inclined position as shown in FIG. 4. Plate 88 extends transversely of the tray assembly at the inner or rear end thereof, and is affixed to depending clamp plate support arms 90 that pivot upon cross bar 58.

Support frame 13 includes a cam bar 92 rotatably mounted upon and extending between extensions 40 of the sideplate 14. Cam bar 92 overlies the plate 88, and is so positioned as to cam the plate downwardly from its FIG. 4 position into clamping engagement with the superposed sales slip S and card C, in response to movement of the tray assembly from the retracted FIG. 4 position thereof, to the advanced, FIG. 5 position thereof.

The clamping plate is normally biased upwardly by a torsion spring 93 (see FIG. 2) one end of which bears upwardly against one of the arms 90, and the other end of which is engaged with the rear end portion of adjacent side flange 54 of tray support plate 53 (see FOG. 5), adjacent a spacer sleeve 94 carried by cross bar 58. A spacer sleeve 96 on cross bar 58 is provided at the opposite side of the clamping means 87, to cooperated with the spring 93 and spacersleeve 94 in limiting the clamping means against lateral displacement.

Figure 7:
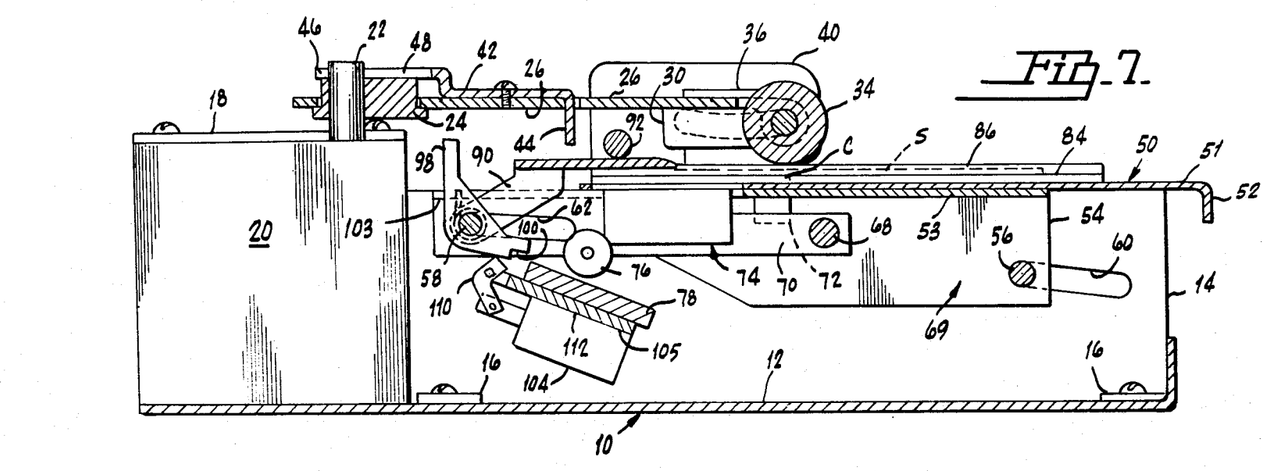
FIG. 7 is a view similar to FIG. 4 in which, in response to a "bad credit" signal, the tray assembly has been unlatched without imprinting thereof.
Figure 7A:
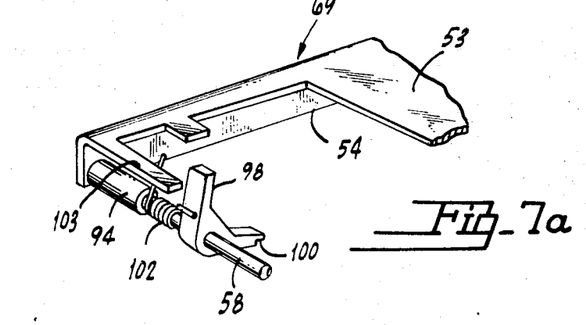
FIG. 7a is a fragmentary perspective view of the inner end of the tray assembly.

The invention includes latching means adapted to releaseably engage the tray 51 in its advanced position. To this end, a latch element or pawl 98, of right-angular shape, has a lower end formed with a latching recess or notch 100. A torsion spring 102 (See FIG. 7a) bears at one end against the latch element, and is coiled about cross bar 58 with its other end engaged against an adjacent projecting portion 103 of tray support plate 53.

It is mainly important that the spring be so retained as to exert a resilient, yielding pressure upon the latch element 98 tending to bias the same clockwise as viewed in FIG. 4, about the crossbar 58.

By reason of this arrangement, when tray 51 is advanced from its FIG. 4 position with the latch element 98 overlying cam plate 78, the latch element will be biased against the tension of its associated spring in a counterclockwise direction, by the cam plate until the latch element moves to a position in which its notch 100 will receive the upper or rear edge of calm plate. This is shown in FIG. 5, wherein it is seen that the engagement between latch element 98 and cam plate 78 will retain the tray in its advanced position. At the same time, the advancement of tray 51 will be effective to cause cam bar 92 to bias plate 88, against the tension of its associated spring 93, to its clamping position shown in FIG. 5.

Further, with movement of tray 51 to advanced position, the cam plate 78 will bias the code-sensing means constituted by arms 70 and block 74 upwardly. This causes the pins 80 to sense the code of card C, closing a circuit according to the sensed code that signals the remotely located central memory. Here there would be stored the desired intelligence with respect to all accounts. Substantially instantaneously, accordingly, if a particular account number is a "good credit" account, the central memory will command the apparatus to imprint the sales slip S with the customer's name and address. This operation may be termed an indication of a first fact with respect to the particular code number.

If, on the other hand, the computer or central memory has stored an alternative, second fact ("bad credit") with respect to the sensed code, the computer commands the apparatus to reflect the existence of said second fact. In the illustrated example, this is done by releasing the tray for retraction by springs 64 with the sales slip devoid of the imprint.

To this end, a means generally designated 103 for reflecting the existence of the second, alternative fact includes a solenoid 104 that is secured to the underside of a solenoid support plate 105, and has a plunger 106 normally disposed, in the deenergized condition of the solenoid, in an extended position.

An angular trip element 110 is pivoted, intermediate its ends, on a lateral projection 112 of plate 105, and is pivotally connected at 114 to the plunger 106. Pawl 98, under the clockwise bias exerted by spring 102, exerts a pressure against element 110 sufficient to normally extend plunger 106.

Assuming that the apparatus has been commanded to reflect the second fact upon the document S, solenoid 104 will be energized instead of motor 20. This causes the plunger to be retracted, as a result of which the trip element 110 rotates counterclockwise as viewed in FIG. 5, to the position thereof shown in FIG. 7. The latch element 98 is accordingly cammed in a counterclockwise direction by the trip element 110, disengaging from the cam plate 78. Tray 51 is immediately retracted by springs 64, and at the same time, block 74 drops downwardly while the clamp plate 88 swings upwardly to release the card and sales slip for extraction from the apparatus.

Conversely, when the apparatus is commanded to indicate the existence of the first fact upon the document, an appropriate impulse from the computer is used to cause operation of motor 20 rather than solenoid 104. As previously noted, motor 20 operates to rotate shaft 22 through a single rotational cycle, causing roller 34 to move through a single back-and-forth stroke, thus to imprint the sales slip.

It will be understood that the embossed characters on the card are directed upwardly, in contact with the upwardly facing sales slip. Accordingly, when the roller exerts pressure upon the face of the sales slip, the characters will be imprinted upon the sales slip by the inked roller, since the only pressure points that will be transmitted to the sales slip are at the locations of the embossed characters of the card. If the sales slip is in multiple, suitable interleavings of carbon paper will correspondingly imprint the duplicates.

When the roller moves from its FIG. 4 to its FIG. 6 position, the finger 44 engages the upwardly projecting end of latch element 98, biasing the latch element counterclockwise to the release position thereof shown in FIG. 6. This frees the tray for retraction. The upper end of the latch element, in these circumstances, slides under the finger 44 as the tray moves to its retracted position.

One circuit, though not necessarily the only circuit, that can be incorporated in the apparatus to accomplish the results discussed above has been illustrated schematically in FIG. 8.

Figure 8:
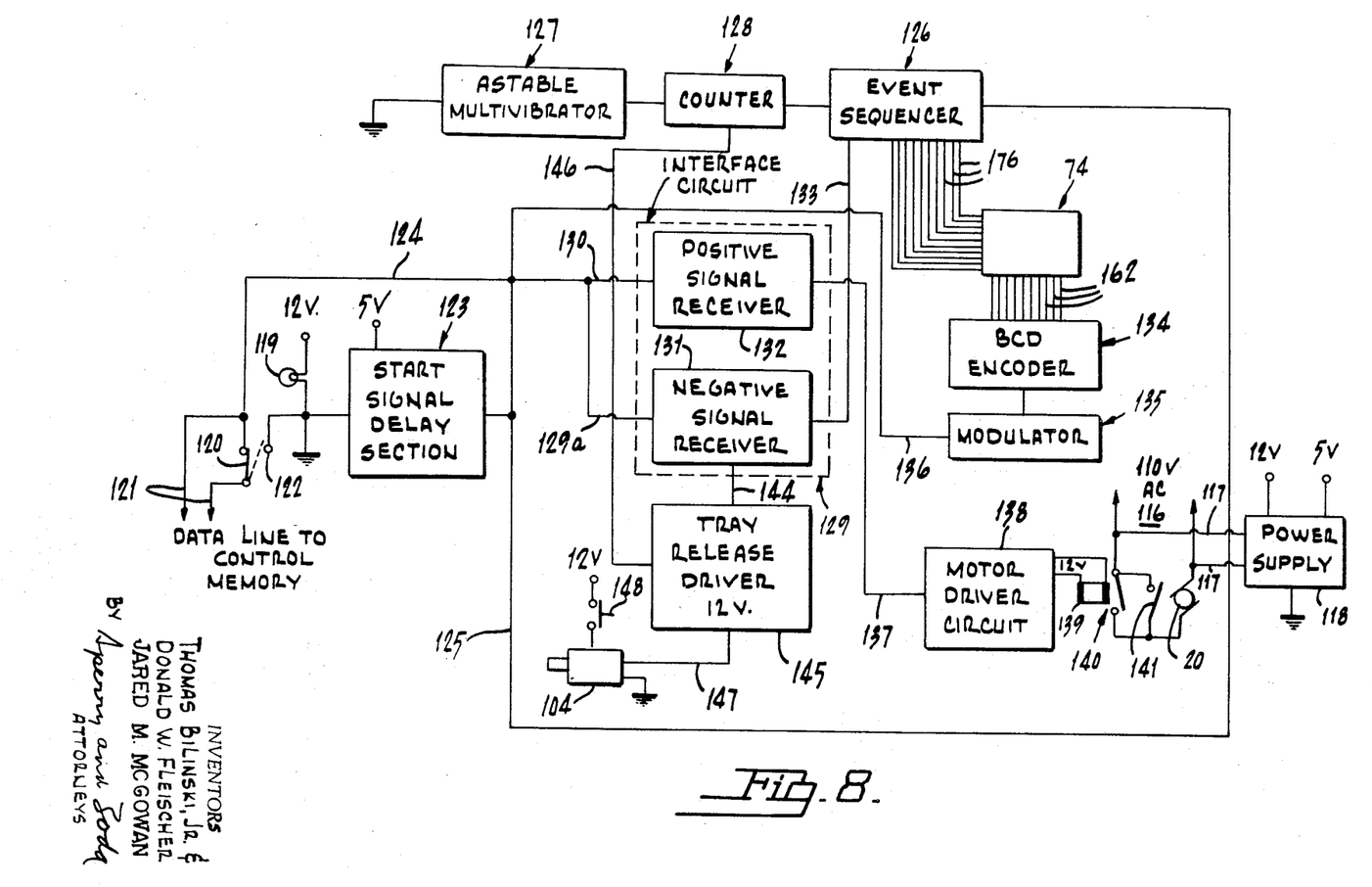
FIG. 8 is a schematic illustration of the circuitry incorporated in the device.
Figure 9:
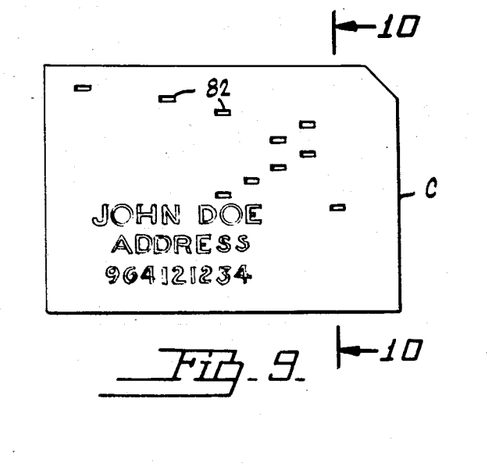
FIG. 9 is an enlarged face view of a credit card that can be used in the device.
Figure 10:
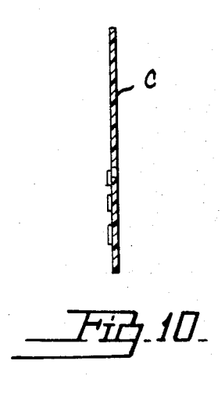
FIG. 10 is a transverse sectional view through the card on line 10—10 of FIG. 9.

Extending from a connection 116 to a conventional 110-volts alternating current power supply is a connection 117 to a power supply circuit 118, in which the power supplied through connection 116 is converted to direct current of low voltages suitable for supply to the various circuits or sections of the device. Typically, provision can be made for the supply of 5-volt and 12-volt current.

Designated at 120 is a single-pole double-throw switch which normally, when the device is on standby, is disposed in position to provide a short across lines 121 extending to a central memory or computer, wherein is stored the information that is to be supplied to the equipment constituting the present invention, in response to a request transmitted from such equipment, calling for said information. The shorting out of the data line 121 extending to the computer is for the purpose of preventing the pickup of noise from the vicinity of the equipment, which noise might tend to actuate the device accidentally.

Figure 12:
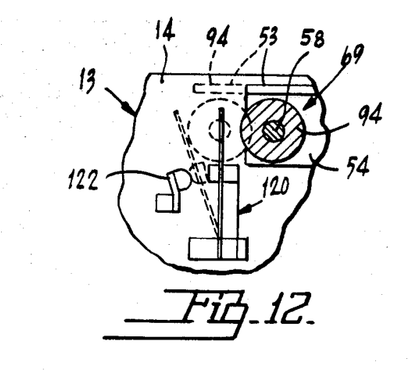
FIG. 12 is an enlarged, detail sectional view through a switch means operated responsive to advancement of the tray assembly from its retracted, full-line to its advanced dotted-line position, taken substantially on line 12—12 of FIG. 2.

Switch 120, as seen from FIG. 12, is mounted upon the chassis 13 of the device, in a position such that is movable arm will be deflected against the spring tension thereof to the dotted line position shown in FIGS. 8 and 12, by tray assembly 69 (and specifically, sleeve 94 thereof), in response to movement of the tray from its extended position to its advanced position. In these circumstances, the movable arm of the switch engages contact 122, so that there is no longer a short across the data line to the central memory. Instead, the central memory is connected, now, to a start signal delay section or circuit 123.

In addition, pilot light 119 is connected across 12 volts, causing it to light and thereby indicate that the tray has been pushed in and the unit is now operating.

Section 123 has a dual function. First and primarily, it has a function of transmitting a signal to the central memory, informing central memory that the equipment is ready to be serviced thereby.

To this end, start signal delay section 123 is connected with one of the two conductors leading to the central memory by a lead 124, and is connected to the other conductor through the switch 120.

As a second function of section 123, a signal is directed through a lead 125 to an event sequencer 126, to reset said sequencer for operation. The sequencer, however, needs to be reset only after power has been interrupted, as for example when the device is first turned on in the morning.

The event sequencer does not otherwise need resetting. In the presence of power, and after having once been reset at its start point, the sequencer 126 is continuously cycling, by reason of the fact that an astable multivibrator 127 and counter 128 are pulsed to time the operation of the event sequencer once it has been set or rest. The multivibrator, counter, and event sequence are conventional per se, as is the start signal delay section 123. Section 123, for example, is a circuit composed of electronic components arranged when the section is actuated by movement of switch 120 to its dotted line position, to produce a predetermined time delay, on the order of perhaps 1 or 2 seconds, before transmitting a signal to the computer indicative of readiness of the equipment to be serviced thereby.

The multivibrator is the source of basic timing of operation of the event sequencer. The signals emanating therefrom are directed to the timing counter which groups a plurality of pulsations of the multivibrator into a pulse of lower frequency. The pulses of the counter are in turn operative upon the event sequencer to pulse, in following order, flip-flops provided in the sequencer. Each flip-flop represents a digit position in the coded number.

Designated at 129 is an interface circuit. Leads 129a, 130, connect negative and positive signal receivers 131, 132 of the interface circuit to lead 124 extending to the data line 121.

It may be noted at this point that a central memory or computer such as would typically be employed in association with a plurality of devices of the type constituting the present invention, serves said devices on a time sharing basis. Therefore, assuming that a number of the devices have signaled the central memory that they are ready to be serviced, the central memory provides such service to the devices in a following order.

Assuming now that the central memory is ready to service the particular device illustrated, a signal is transmitted over the data line to the interface circuit, which signal in effect informs the device of the readiness of the central memory to accept the coded request for information, that is, the coded account number of the card C.

In the illustrated arrangement, the direction from the central memory to the device, that the device start to transmit the coded request for information, arrives at the negative signal receiver 131. This in turn starts the event sequencer, through a signal transmitted through lead 133 extending thereto from the negative signal receiver 131.

The event sequencer, as noted above, when started, is sequenced by the counter 128.

Pin block 74 has its 10 digit position leads 176 connected to the sequencer 126. The digit value leads 162 of pin block 74 are connected to BCD encoder 134.

In effect, the encoder 134 has been provided with 10-digit value pulses or signals, through the leads 162.

By operation of counter 128, a pulse is directed through each lead 176 from the sequencer, in a successively following order, that is, a pulse may first be directed through lead 176 shown as the lead furthest to the left in FIG. 8, after which a pulse is directed through the next adjacent lead 176, and so on until a pulse has been transmitted through the lead 176 furthest to the right in FIG. 8. As described previously herein, each of the leads 176 extends to a connection to a digit value lead 162, of a prescribed digit value according to the location of the coded apertures of the card C. Therefore, the digit value signals directed to the encoder 134 through leads 162 are transmitted in the required, sequential order according to their positions in the complete account number. In the present instance, this number is 9641212340.

As a result, there is impressed upon the encoder 134, through leads 162, signal impulses corresponding to the digits making up this particular number, and these impulses will be so impressed upon the encoder in the order in which they appear upon the account number, by operation of the event sequencer under the control of the counter 128. Assuming, thus, that the leads 162 correspond to digit values ascending from 0 through 9 from right to left in FIG. 8, the sequence in which these would be impressed upon the encoder 134 would be as follows: First, since lead 176 from the event sequencer that corresponds to the first digit position has been electrically connected to the lead 162 corresponding to digit value "9", the first impulse impressed upon the encoder through leads 162 would be through that lead corresponding to digit value "9", that is, the lead 162 furthest to the left in FIG. 8, after which the next impulse, transmitted through lead 176 second from the left in FIG. 8, would be impressed upon the encoder through lead 162 fourth from the left in FIG. 8, since this is the lead that is electrically connected to the lead 176 which is the second lead in the order of sequencing, that is, the lead corresponding to the second digit position. This is continued, as will be understood, through the remainder of the credit card number.

An encoder such as schematically represented in conventional, as is the multivibrator, counter, and event sequencer, and also conventional is a modulator 135 through which the encoded number is transmitted, via lead 136, and lead 124, to the central memory data line and hence to the central memory.

Upon receipt of the encoded credit card number at central memory, said number is processed therethrough, and if it is found that the holder of the number has good credit, a positive signal is sent back by the central memory to positive signal receiver 132, which in turn, through lead 137, pulses a motor driver circuit 138. Circuit 138 is an electronic switching circuit, which is designed, when it receives a positive pulse through lead 137, to trigger flow from the 12-volt power supply through the winding of a relay 139, having normally open contacts 140. Contacts 140 thus close, so as to close a circuit to motor 20 from the 110-volt AC power supply.

Motor driver circuit 138 contains a flip-flop which holds relay 139 energized after removal of the positive good credit pulse. This flip-flop holds relay 139 energized until such time as microswitch 141 closes and completes a parallel path to hold motor 20 on. Thus the function of holding motor 20 on is transferred from relay 139 to microswitch 141. In other words relay 139 turns the motor on and switch 141 turns it off.

Switch 141 is of the type wherein its operating leaf 143 is normally spring biased outwardly as in FIG. 2. In these circumstances, the switch is closed.

It will thus be seen that when the carrier plate 26 moves back to its initial position, arm 142 engages 143 leaf 143 of switch 141, and operates it to switch-opening position, thus opening the circuit to the motor at the conclusion of the single rotational cycle of eccentric 24.

If the central memory transmits a signal that the credit of the card holder is bad, this signal would be a negative signal, impressed upon the negative signal receiver 131 through lead 129a.

A lead 144 connects the negative signal receiver 131 to a tray release driver circuit 145. A lead extends from counter 128 to circuit 145.

The circuit 145 electronically triggers an impulse through the 12-volt power supply, through lead 147, to the solenoid 104. In this connection, circuit 145 is so designed as to require a signal both from the counter 128, and from the negative signal receiver, before it will operate to close the circuit through the solenoid.

The negative signal that receiver 131 accepted to start the event sequencer through lead 133 was a short signal. The negative signal impressed upon receiver 131 to drive the tray release circuit 145, however, is a long signal. The signal impulses received from counter 128 are at intervals apart longer than the duration of the short signal directed to the event sequencer through lead 133, but shorter than the duration of the long negative signal used to indicate bad credit.

Circuit 145 operates to energize solenoid 104 only if the negative signal indicating bad credit is still present therein when circuit 145 is pulsed by the counter. Circuit 145, thus, energizes the solenoid only when it has both a long negative signal, and a signal from the counter.

In effect, thus, the counter 128 is used to time the operation of the event sequencer, and is also used as a means for discriminating between short and long negative impulses impressed upon the tray release driver circuit 145, so that said circuit will energize the solenoid only in the presence of a "bad credit" signal.

In these circumstances, the solenoid when energized will release the tray as previously described herein, to eject the card and sales slip without imprint.

Means is provided whereby the clerk can release the tray at any time before the cycle is completed, should this be necessary or desirable. To this end, a momentary, normally off switch 148 (see FIGS 1 and 8) may be operated by the user, to close a circuit directly from the 12-volt power supply to the solenoid at any time before the cycle is completed, to release the tray and eject the card and sales slip without imprint.

As previously indicated herein, each of the circuits or sections shown as block in the FIG. 8 diagram are, per se, conventional, in the computer art and in other arts relating thereto, particularly with regard to the transmission of coded information, and the use of the impulses so transmitted to time the operation of other circuits, or trigger power flow to effect operation of mechanical elements. The pin block 74, however, is not conventional and is believed novel. It is, in fact, capable of use in any of a wide variety of devices in which electrical impulses are to be derived from code openings, notches, or recesses of a coded card element. Further, although the circuits or sections shown in FIG. 8 by block diagram may be individually old, it is believed that the illustrated and described combination thereof with each other, and with the pin block, is not conventional, and is novel in the art.

We claim:

1. Apparatus for reading a coded card, and for reflecting upon an accompanying document the existence of alternative facts with respect to said card according to information stored at a remotely located central memory, comprising:
   a. a support frame;
   b. a card and document support means mounted thereon for movement by a user from a normally retracted to an advanced position, and adapted to support both a coded card and an accompanying document, said means when retracted being at least partially exposed to receive the card and said document and being bodily shiftably inwardly to its advanced position with the card and said document supported thereon;
   c. latch means releaseably holding the card and document support means in its advanced position;
   d. sensing means responding to movement of the card and document support means to its advanced position to read out the code impressed upon the card and transmit the same to a central memory;
   e. means responding to the transmission, from the central memory, of a first fact as to the card to indicate the existence of said first fact on the document accompanying the card and unlatch the card and document support means for return to its normal position; and
   f. means responding to the transmission, from the central memory, of an alternative, second fact as to the card to unlatch the card and document support means for return to its normal position without indication of the existence of said first fact.

2. Apparatus as in claim 1 wherein the means for indicating the first fact includes a printing assembly movable, in response to said transmission of the first fact, to a printing position in which it imprints the document with an indication of the existence of the first fact and thereafter trips the latch means to release the card support means for return to its normal position.

3. Apparatus as in claim 2 wherein the printing assembly includes a roller shiftable from a rest position through a path in which it imprints upon said document characters embossed upon the card, said assembly further including a motor energized upon a signal from said central memory, a motion-translating driving connection between the motor and roller to shift the roller through said path, and a latch trip arm carried with the roller through said path and disengaging the latch means following imprinting of said document.

4. Apparatus as in claim 1 wherein the card support means includes a tray assembly sliding on the frame between said retracted and advanced positions and providing a flat surface for supporting said card and document.

5. Apparatus as in claim 4 wherein the sensing means is movably supported on the tray assembly, the support frame including a cam surface biasing the sensing means into contact with the card for reading the code thereof responsive to sliding of the tray assembly to its advanced position.

6. Apparatus as in claim 5 wherein the sensing means includes a block supporting a multiplicity of normally closed contacts each of which represents a code character, at least one of which contacts, upon biasing of the sensing means into contact with the card, registers with an aperture of the card to remain in closed condition and thereby read the code of the card, simultaneously with depression, by the card, of the remaining contacts to open position.

7. Apparatus as in claim 1 further including means supported for movement from a normally retracted position to a position clampably engaging the card in position for engagement by the sensing means in response to said movement of the card support means to its advanced position.

8. Apparatus as in claim 7 wherein said card-clamping means includes a clamping plate pivotally supported upon and movable bodily with the card support means, the frame including a cam member biasing the clamping plate into its clamping engagement with the card upon movement of the card support means to it advance position.

9. Apparatus as in claim 8 wherein the means responding to transmission of the second fact includes a solenoid on the frame having a plunger, and a trip element on the plunger, said solenoid being energized in response to transmission of the second fact from the central memory to actuate the plunger, said trip element disengaging the latch means upon actuation of the plunger to release the card support means for return to its normally retracted position.

10. Apparatus as in claim 1 wherein the card support means includes a tray assembly mounted for sliding movement on the frame between said retracted and advanced positions, said latch means comprising a pawl pivotally mounted on the tray assembly and latchingly engaging the frame upon movement of the tray assembly to the advanced position thereof, said sensing means being pivoted on the tray assembly in position to be cammed by the frame into code-reading position in response to said moment of the tray assembly to its advanced position, the means responding to the transmission of the first fact including a pawl trip and a motor-driven printing roller supported by the frame and operable to positions in which the trip disengages the pawl from the frame and the roller effects imprinting of the document, said means responsive to the transmission of the second fact including a trip element actuable, upon transmission of the second fact, to a position in which it disengages the pawl from the frame without imprinting of the document.

11. A block for effecting electrical circuit connections corresponding to a coded card having open areas representing the code thereof comprising:
a. a housing having a card receiving surface;
b. a series of electrically conductive strips representing the position of the several characters of a coded integer;
c. a series of electrically conductive strips representing the values of said characters and intersecting the strips of the first series, the strips of at least one series having contacts normally engaged with adjacent strips of the other series at the points of intersection; and
d. biasing means associated with the several contacts, and mounted in the housing for movement by a supported card to positions biasing their associated contacts out of engagement with said adjacent strip, some of said means registering with the open areas of the card so as not be moved thereby, whereby to leave their associated contacts in engagement with adjacent strip for making electrical connections between the character position and character value strips corresponding to said code.

12. A block as in claim 11 wherein the strips of the first and second series intersect in perpendicular relation to each other for disposition of said contacts in parallel rows in which corresponding contact are aligned transversely of the rows.

13. A block as in claim 11 wherein each of the strips having the contacts includes a flat base portion and contact arms extending therefrom, said arms being spaced longitudinally of the base portion and being springbiased into engagement with said adjacent strips of the other series.

14. A block as in claim 13 wherein said base portions lie in a common plane offset from and parallel to a common plane in which are disposed the strips of said other series, the contact arms extending within and being deflectable in the space between said planes.

15. A block as in claim 11 wherein said means are in the form of pins mounted in the housing to shift in the direction of their lengths.

16. A block as in claim 15 wherein one end of the pin projects beyond said surface for engagement by the received card, the other ends of the pins being disposed adjacent the contacts for biasing the same out of engagement with said adjacent strips by the pins shift by the card.

17. A block as in claim 16 wherein said contacts are under spring tension tending to shift the pins outwardly of the housing, the pins being formed with shoulders engageable by the housing to limit said shifting of the pins by the contacts.

18. A block as in claim 14 wherein said means comprises pins mounted in the housing for movement in the direction of their lengths in paths normal to said planes, one end of the pins projecting above said surface for engagement by the received card to shift the pins, the other ends of the pins engaging said contact arms for deflecting the arms responsive to the shifting of the pins in said direction.

* * * * *